[11] 3,572,617

[72] Inventor  Armand G. Ricard
              Viroflay, Yvelines, France
[21] Appl. No. 802,380
[22] Filed     Feb. 26, 1969
[45] Patented  Mar. 30, 1971
[73] Assignee  Brequet-Aviation
              Velizy, Yvelines, France
[32] Priority  Mar. 5, 1968
[33]          France
[31]          142,393

[54] AIRCRAFT OF VARIABLE CONFIGURATION
     6 Claims, 12 Drawing Figs.
[52] U.S. Cl...................................... 244/46,
                                                   244/43
[51] Int. Cl....................................... B64c 3/40
[50] Field of Search............................ 244/46, 49,
                                                   41, 42, 43

[56]         References Cited
          UNITED STATES PATENTS
3,104,082  9/1968  Polhamus..................... 244/46
3,292,881 12/1966  Ricard.......................... 244/46
3,456,905  7/1969  Bielefeldt...................... 244/43

Primary Examiner—Milton Buchler
Assistant Examiner—Carl A. Rutledge
Attorneys—Howard J. Churchill, Robert S. Dunham, P. E. Henninger, Lester W. Clark, Thomas F. Moran, Gerald W. Griffin and Abraham Engle ABSTRACT: An aircraft having variable geometry has compensating devices at the front of the folding wings. These devices comprise two flaps articulated to one another along an axis parallel to the pivoting folding axis of the wing.

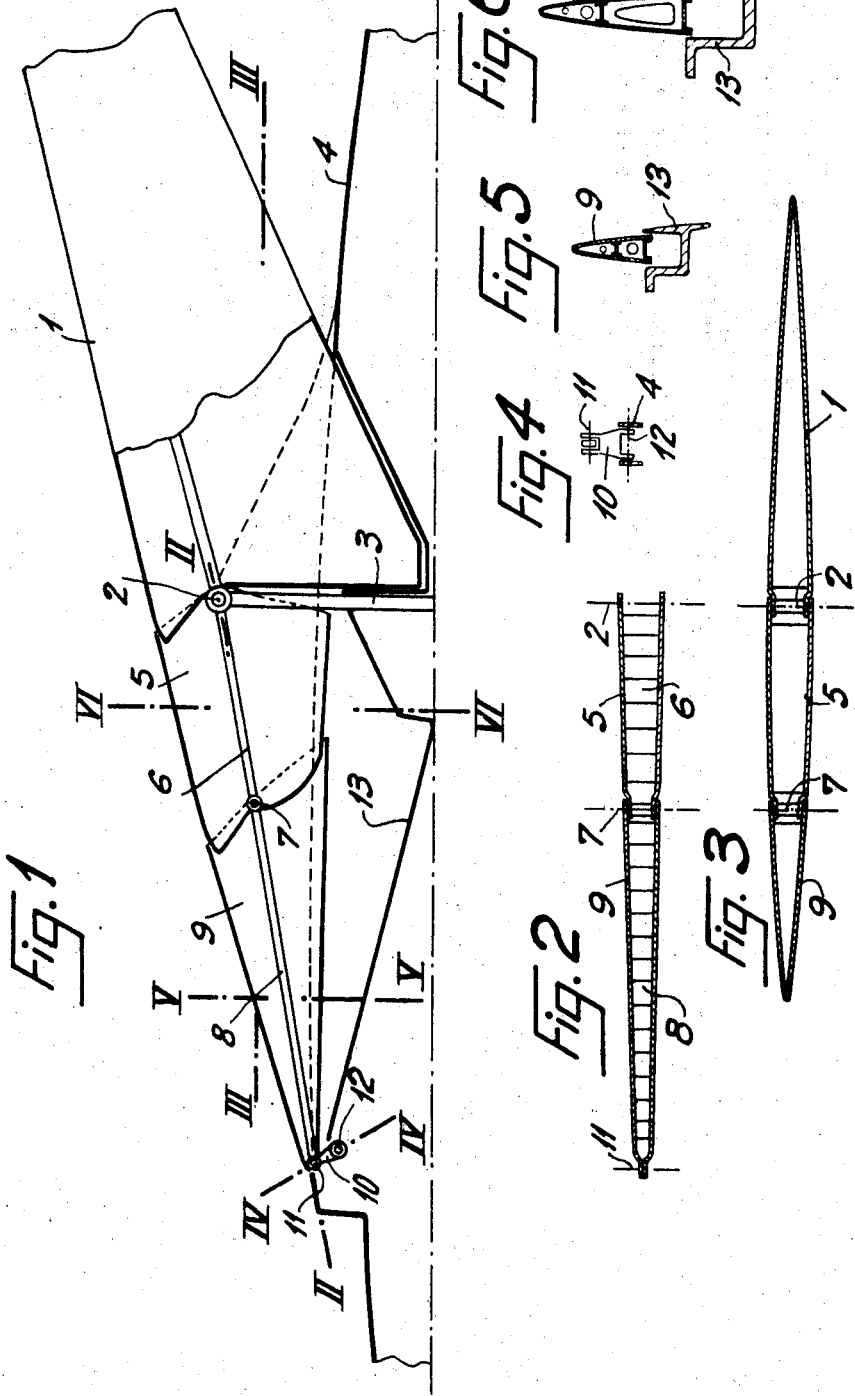

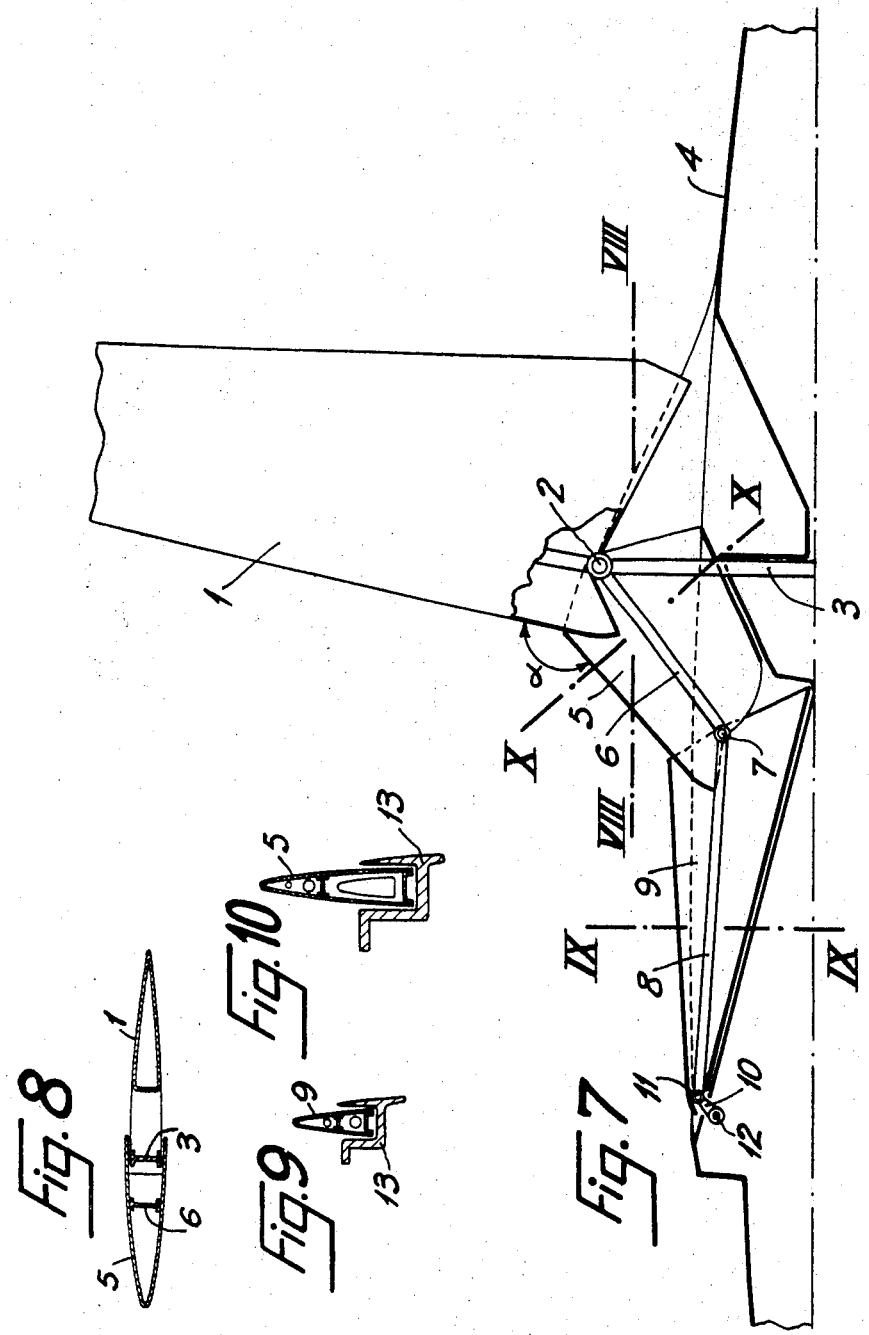

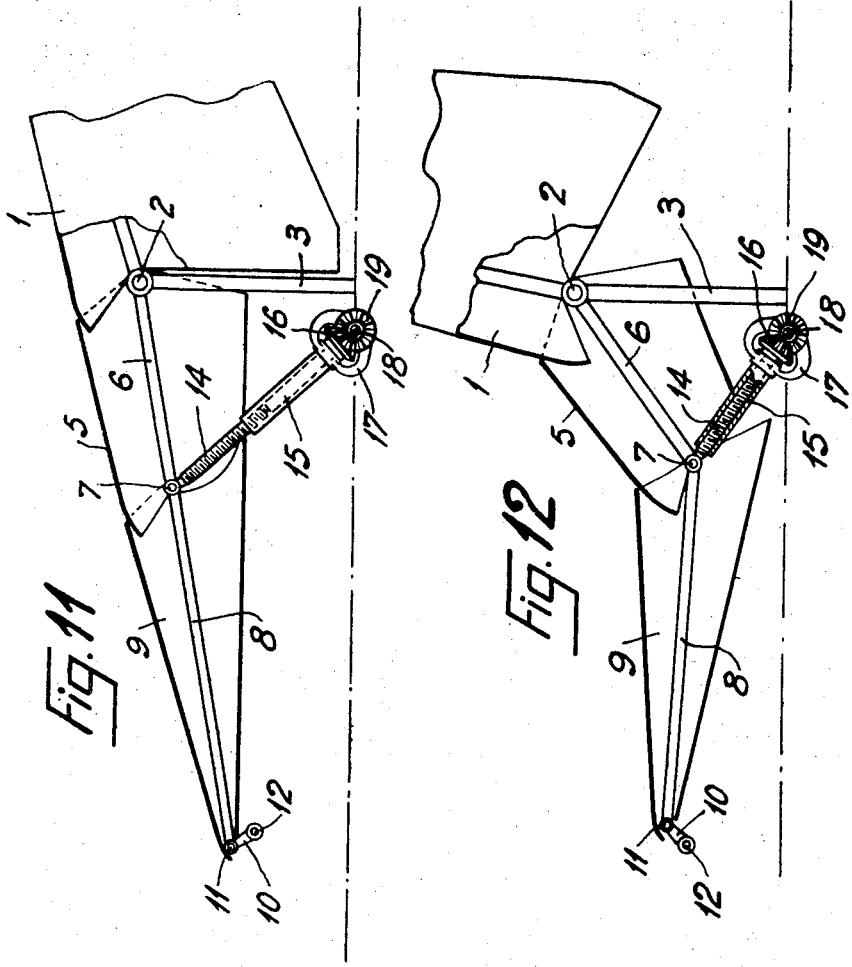

AIRCRAFT OF VARIABLE CONFIGURATION

U.S. Pat. No. 3,292,881 discloses an aircraft of variable configuration or "geometry" in which to compensate displacements of the center of thrust which accompany the folding or unfolding movements of the wings, the wings are associated at the front and in the vicinity of the fuselage with compensating devices formed by mobile portions which are articulated to the same pivots as the main portions of the wings and which partly enter the fuselage when the wings are unfolded, and emerge therefrom when the wings are folded.

Compensating devices of the kind specified have disadvantages due to the fact that when the wing is unfolded, the angle of attack of the front portion makes with that of the remainder of the wing a relatively small angle which is harmful to the aerodynamic flow, and moreover, the front surface of the front portion, even when it is partly withdrawn, sets up when the aircraft takes off for high-speed flight stalling movements which are rather difficult to counteract by the action of the tail unit.

The present Patent Application relates to improvements in the Patent referred to above with a view to obviating these disadvantages.

To this end, the compensating devices take the form of two flaps which are articulated to one another along an axis parallel with the pivoting axis of the wing. The rear flap is articulated to the wing around this pivoting axis, while the front flap is connected to the fuselage via an articulation free enough to enable the compensating device to be maneuvered by displacement of the articulation common to the two flaps.

As a result of this novel arrangement, when the wings are unfolded, the edge of attack of the rear flap of each compensating device makes a larger angle than according to U.S. Pat. No. 3,292,881 with that of the remainder of the wing, while the front flap is further withdrawn into the fuselage, thus obviating the aforementioned disadvantages. The invention will be clearly understand from the following description of an exemplary embodiment thereof with reference to the accompanying drawings.

FIG. 1 is a half-view, partly in longitudinal section, of an aircraft having an improved compensating device according to the present Patent Application, showing the wing folded;

FIG. 2 is a section taken along the line 11–11 in FIG. 1;

FIG. 3 is a section taken along the line 111–111 in FIG. 1;

FIGS. 4, 5 and 6 are partial sections through details, taken through the lines IV–IV, V–V and VI–VI respectively in FIG. 1;

FIG. 7 is a view similar to FIG. 1, but showing the position occupied by the compensating device when the wing is unfolded;

FIGS. 8, 9 and 10 are sections taken along the lines VIII–VIII, IX–IX and X–X respectively in FIG. 7; and FIGS. 11 and 12 are diagrammatic views illustrating the control of the movement of the compensating flaps.

In the embodiment illustrated in the drawings, the actual wing 1 can pivot, in the manner disclosed in U.S. Pat. No. 3,292,881, around a pivot 2 borne by framework 3 of the aircraft fuselage 4.

The compensating device comprises a rear flap 5 articulated to the same pivot 2 as the wing 1, the main longitudinal member 6 of the rear flap 5 bearing a pivot 7 to which the main longitudinal member 8 of a front flap 9 is articulated.

The flap 9 is connected to the fuselage via a connecting rod 10 and pivots 11, 12 as shown most clearly in FIG. 4.

The rear flap is substantially pentagonal in shape, as shown in the drawings, while the front flap is of triangular configuration.

The rear edge of the front flap covers the flap 5, while the latter in turn covers the front edge of the wing 1.

The assembly of flaps 5, 9 forms a structure which stands up satisfactorily to bending and torsion.

When the wing is folded, as shown in FIG. 1, the edges of attack of the two flaps and the edge of the wing are in alignment. When the wing is unfolded, as shown in FIG. 7, the flaps are partly withdrawn into a recess 13 with which the fuselage is formed to this end.

The front flap 9 is practically completely withdrawn, while the rear flap 5 makes with the fuselage a relatively large angle than in the case of the single flap according to the U.S. Pat. No. 3,292,881, so that the angle $\alpha$ made by the edge of attack of the flap 5 with that of the wing 1 is substantially increased.

FIGS. 3 and 8 show the difference in profiles. It will be noted that in the high-speed flight position FIGS. 1 and 3), the chord of the profile is much larger than in the other position (FIGS. 7 and 8), so that the elongations of the profile are much less. Moreover, the edges of attack of the flaps 5 are much more pointed in the position shown in FIG. 1 than in that shown in FIG. 2, thus ensuring superior adaptation to flight conditions in both cases.

FIGS. 11 and 12 show how the movements of the compensating device can be controlled.

To this end, a screw-threaded rod 14 is articulated to the pivot 7 shared by the two flaps. The rod 14 engages in a tapped bush 15 unitary with a conical pinion 16 and mounted in a strap 17 which can pivot around the shaft 18 of a conical pinion 19 meshing with the pinion 16. The flaps can be brought in or out by rotating the shaft 18. These movements are possible due to the freedom conferred by the connecting rod 10 on the point of the flap 9.

I claim:

1. In an aircraft of variable configuration, in which each wing comprises a main portion articulated to the fuselage around a pivot, and a compensating device articulated to the same pivot as the wing and adapted to compensate for displacements in the center of thrust which accompany the folding and unfolding movements of the wings, the improvement that the compensating device comprises two flaps which are articulated to one another, one of the flaps being articulated at the front to the fuselage, the other flap being articulated at the rear to the pivot of the main portion of the wing.

2. The aircraft specified in claim 1, characterized in that the front flap is triangular in shape, while the rear flap has a pentagonal configuration.

3. The aircraft specified in claim 1, characterized in that the rear edge of the front flap covers the front edge of the rear flap, the rear flap similarly covering the front edge of the wing.

4. The aircraft specified in claim 1, characterized in that the front flap is articulated to the fuselage via a connecting rod.

5. The aircraft specified in claim 1, characterized in that means are provided to move the flaps by acting on their common articulation.

6. The aircraft specified in claim 5, characterized in that the common articulation of the flaps is connected to a drive shaft via a screw-and-tapped-bush device.